June 3, 1930.     R. V. HUTCHINSON     1,761,922
WORM GEAR AXLE
Filed April 27, 1929
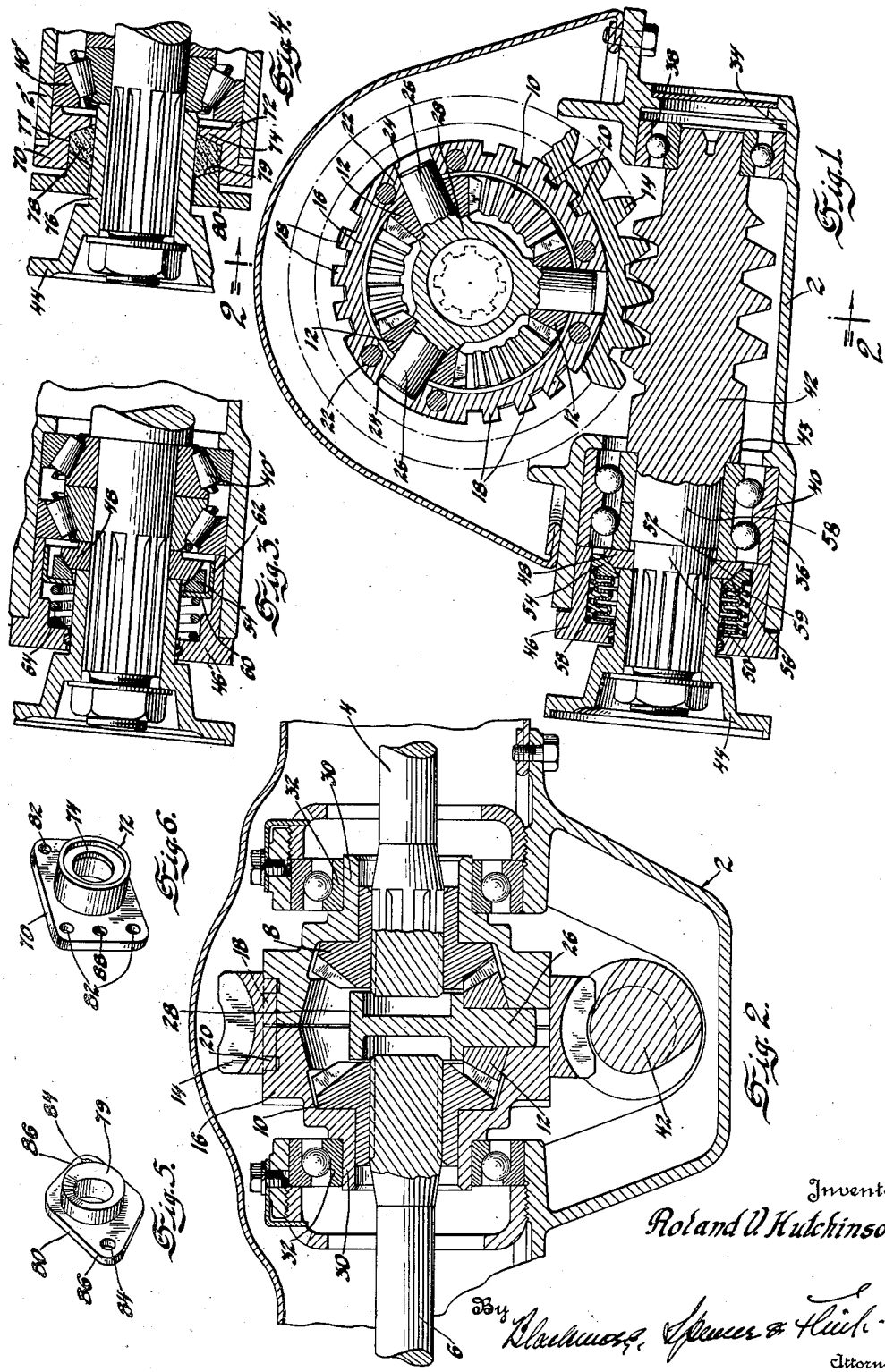
Inventor
Roland V Hutchinson
By
Attorneys Patented June 3, 1930

1,761,922

UNITED STATES PATENT OFFICE

ROLAND V. HUTCHINSON, OF LANSING, MICHIGAN, ASSIGNOR TO GENERAL MOTORS CORPORATION, OF DETROIT, MICHIGAN, A CORPORATION OF DELAWARE

WORM-GEAR AXLE

Application filed April 27, 1929. Serial No. 358,585.

This invention relates to automotive vehicles and has particular reference to improvements in structural details at the rear axle where the propeller shaft joins onto the differential.

The improvements relate to worm driven rear axles having an underslung usually inclined propeller shaft. In the past it has been customary to provide the rear or lowermost end of the propeller shaft or worm which drives the differential with a thrust bearing which extended rearwardly of and below the axle housing and decreased the ground clearance. In the present invention the thrust bearing is placed at the front, leaving but the ordinary radial bearing at the rear. Because of the fact that the drive axle is inclined, the placing of the thrust bearing at the front end will increase the ground clearance without interfering with the effective operation of the drive.

A novel oil seal is also placed at the front end of the thrust bearing. This novel oil seal comprises a washer secured to the propeller shaft and having an outer spherical formation or seat. On this seat there is fitted the corresponding spherical seat of a spherical sealing ring preferably made of brass or durex. To the ring there is secured one end of a bellows the opposite end of which is secured to a retainer for the thrust bearing. The bellows presses or urges the ring against the seat of the washer to maintain an oil tight or non-leak proof connection at all times. The spherical portions of the washer and ring are preferably formed or generated from a center which coincides at the center of zero bending of the forward portion of the wormshaft.

A further feature of the invention is in providing the usual differential carrier of the conventional differential with a number of interrupted splines and mounting on a stud at each interrupted portion one of the usual differential pinions. The object of this construction is to obtain a reduction in diameter of the gears and hence a closer center or reduced center distance.

As a modification of the invention instead of the bellows used on the oil seal it is within the scope of the invention to use a flanged washer which seats on the ring and is pressed against the spherical seat by means of a coil spring.

As a further modification of the invention use may be made of a packing held between a suitable gland and a retainer around one of the sleeved ends of the universal joint. By forcing the retaining member and gland together an oil tight seal is obtained.

On the drawing:

Fig. 1 shows a transverse sectional view through the differential and driving gearing of the rear axle of an automotive vehicle, showing the inclined propeller shaft worm.

Fig. 2 is a section on the line 2—2 of Fig. 1.

Fig. 3 is a modification of the oil seal shown in Fig. 1.

Fig. 4 is a further modification of the oil seal.

Figs. 5 and 6 are perspective views of the retaining members for the seal of Fig. 4.

Referring to the drawing the numeral 2 indicates the differential carrier of an automotive vehicle. In the housing there is enclosed the driven axle comprising the two halves 4 and 6. Each axle half has secured to its ends the bevel gears 8 and 10 which mesh with the pinions 12 of the differential. The differential is of the usual type and comprises the worm gear 14 and the differential pinion case 16. The carrier is provided at its outer portion with the splines 18 which mesh with and correspond to the splines 20 of the ring gear 14.

By referring to Fig. 1 it will be noted that at intervals as shown at 22 the splines of the case 16 as well as on the ring gear 14 are interrupted. At each of these interrupted portions a bearing opening 24 is provided and in each opening there is mounted one stud 26 of a spider 28. On each stud 26 one of the differential pinions 12 is mounted.

In prior constructions the splines 18 and 20 have extended around the entire periphery of the pinion carrier which necessitated a much larger case. The structure of the present invention enables a small worm gear 14 to be used and produces a general reduction in the diameter of the gears and hence a closer center distance.

At each side of the differential case 16 the extensions 30 are provided, which extensions are received in the bearings 32 to permit of the easy rotation of the pinion carrier. The shafts 4 and 6 pass through the extensions 30.

At the lower portion of the axle housing 2, the usual rear and front bearing seats 34 and 36 are provided. At the rear bearing seat 34 the usual radial bearing 38 is provided while at the front a thrust bearing 40 is positioned. In the present practice the position of the bearings 38 and 40 is usually reversed; that is, the thrust bearing 40 is at the rear while the radial bearing 38 is at the front. As will be seen from Fig. 1, the worm 42 has a shoulder 43 abutting the bearing 40 and is inclined to the horizontal to correspond to the inclination of the propeller shaft, the universal joint flange of which is indicated at 44. With the bearing 40 at the rear in place of the bearing 38 it will be apparent that a much lesser ground clearance will be allowed for the reason that the bearing 40 is much larger and would therefore extend further to the rear and further downward than the bearing 38. The arrangement of the invention therefore permits of a greater ground clearance, and with a reduction in gear diameter brought about by the interrupted splines 22 on the pinion carrier 16.

The differential carrier 2 is provided with an opening at its front end to allow for the insertion of the worm 42. In this opening the bearing 40 (which may be either ball or roller) is mounted which bearing is held in position by means of the retaining member 46 preferably secured by means of bolts (not shown) to the differential carrier 2.

A washer 48 is rigidly mounted on the shaft portion 50 of the worm 42 and has its outer portion formed with a spherical seat as indicated at 52. A sealing ring 54 fits over the washer 48 and is provided with a spherical seat 56 which conforms to the spherical seat 52 on the washer 48. The center of the sphere defined by the surfaces 52 and 56 is positioned at 58 which is the center of zero bending, or at approximately the center of the bearing 40.

A bellows 58 is secured in oil tight relation, at one end to the ring 54 and at its opposite end to the retainer 46. Owing to the flexibility of the bellows the ring 54 will be urged constantly against the washer 48 to maintain the spherical surfaces 52 and 56 tightly in contact and at all times to form a tight or leak proof oil joint or seal. In addition the helical compression spring 59, abutting against 46 and 54 assists in the sealing.

Owing to the fact that the center of the spherical surfaces is at the center of the bearing or at the center of the zero bending, any movement of the shaft 50 about the zero bending center will also shift the spherical surfaces relatively to each other to thereby insure a tight seal at all times in spite of distortion of the parts.

The bellows 58 also prevents the escape of oil from the bearing. By referring to Fig. 1 it will be noted that a slight clearance is allowed between the ring 54 and the interior of the retaining member 46. This will allow oil to escape to the space between the bellows and the retainer 46 but no oil will be permitted to escape because of the tightness of the contact of the bellows with the ring and retainer. A spring 59 is also provided to press the sealing ring 54 against the washer 48.

By referring to Fig. 3 it will be seen that instead of the ball bearing 40 of Fig. 1, a tapered roller bearing 40' is used. Either form of bearing will work just as well. The washer 48 is the same as that shown in Fig. 1 while the ring 54' is slightly modified. Around the ring 54' there is seated the washer 60 having the flanged edge 62. The flange 62 is in liquid tight relation with the interior of the retainer 46'. A coil spring 64 is held between the retainer and the washer 60 and urges the washer 60 and ring 54' toward the washer 48 to maintain the spherical surfaces in contact at all times to thereby form a tight oil seal.

Referring to Figs. 4, 5 and 6, it will be seen that a different type of oil seal is provided. The bearing 40' is the same as that shown in Fig. 3.

At the end of the axle housing 2' a retainer 70 is provided. This retainer has the annular inner portion 72 which presses against and holds the bearing 40' in place. The retainer 70 has the inwardly extending annular portion 74 which fits closely (actually about 0025 to 004" clearance radially) about the sleeve portion 76 of the universal joint flange 44. A packing 78 is seated within the hollow 77 of the retainer 70 and over this packing there is received the collar portion 79 of the gland 80 to firmly force the packing into liquid tight relation with the sleeve 76 of the universal joint.

The retainer 70 is secured to the axle housing 2' by means of bolts passing through the openings indicated at 82 in Fig. 6. The gland 80 is secured to the retainer 70 (and also to the axle housing if desired) by means of the bolts passing through openings 84 in ears 86 formed at one side of the gland. The retainer 70 is provided with lateral openings 88 (which conform with the openings 84) and are adapted to accommodate the bolts which secure the gland 80 to the retainer 70 and housing 2'.

I claim:

1. In a differential, a ring gear surrounding said differential, a pinion case inside said gear, meshing splines on said gear and case, conforming interrupted portions on said splined portions, a differential pinion spider having a plurality of arms, said arms mounted in openings formed at said interrupted portions of said case, and pinions mounted on said arms.

2. In a differential, an outer ring gear, an inner pinion case rigidly connected with said gear by means of interfitting sectors, mating plain portions intermediate said sectors, and a pinion carrier mounted at said plain portions.

3. In a differential, an outer ring gear, an inner pinion case rigidly connected with said gear by means of interfitting sectors, mating plain portions intermediate said sectors, a pinion carrier, and arms on said carrier mounted at said plain portions, the ends of said arms extending past the inner circumference of said interfitting sectors.

In testimony whereof I affix my signature.

ROLAND V. HUTCHINSON.